US012670790B2

(12) United States Patent
Jornod et al.

(10) Patent No.:  US 12,670,790 B2
(45) Date of Patent:      Jun. 30, 2026

(54) COMPUTER PROGRAM, APPARATUS, AND METHOD FOR A REMOTE CONTROL CENTER AND FOR OPERATING A VEHICLE FROM REMOTE

(71) Applicant: Volkswagen Aktiengesellschaft, Wolfsburg (DE)

(72) Inventors: Guillaume Jornod, Berlin (DE); Andreas Pfadler, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 266 days.

(21) Appl. No.: 18/547,435

(22) PCT Filed: Feb. 22, 2022

(86) PCT No.: PCT/EP2022/054390
§ 371 (c)(1),
(2) Date: Aug. 22, 2023

(87) PCT Pub. No.: WO2022/180029
PCT Pub. Date: Sep. 1, 2022

(65) Prior Publication Data
US 2024/0135814 A1     Apr. 25, 2024
US 2024/0233533 A9     Jul. 11, 2024

(30) Foreign Application Priority Data
Feb. 24, 2021    (EP) ..................................... 21159109

(51) Int. Cl.
*G08G 1/09*        (2006.01)
*G05D 1/22*        (2024.01)
(Continued)

(52) U.S. Cl.
CPC ....... *G08G 1/096725* (2013.01); *G05D 1/226* (2024.01); *G05D 1/229* (2024.01); *G08G 1/096775* (2013.01); *H04B 17/373* (2015.01)

(58) Field of Classification Search
None
See application file for complete search history.

(56) References Cited

U.S. PATENT DOCUMENTS

| | | | | |
|---|---|---|---|---|
| 8,020,657 | B2 | 9/2011 | Allard et al. | |
| 12,107,739 | B2 * | 10/2024 | Jia ..................... | H04W 28/0226 |
| 2021/0037495 | A1 * | 2/2021 | Pfadler ............. | H04W 56/0065 |

FOREIGN PATENT DOCUMENTS

| | | |
|---|---|---|
| EP | 3702864 A1 | 9/2020 |
| EP | 3723412 A1 | 10/2020 |

(Continued)

OTHER PUBLICATIONS

PCT/EP2022/054390. International Search Report & Written Opinion (Mar. 24, 2022).

(Continued)

*Primary Examiner* — Adam D Tissot
(74) *Attorney, Agent, or Firm* — Peter Zura; LOZA & LOZA, LLP

(57) ABSTRACT

Technologies and techniques for a remote control center and for operating a vehicle from remote. Information is obtained on a pQoS of a communication link between the remote control center and the vehicle. At least one driving command is then provided to the vehicle via the communication link and a range of the at least one driving command is adapted, based on the information on the pQoS.

20 Claims, 4 Drawing Sheets

(51) Int. Cl.
|  |  |
|---|---|
| *G05D 1/226* | (2024.01) |
| *G05D 1/229* | (2024.01) |
| *G08G 1/0967* | (2006.01) |
| *H04B 17/373* | (2015.01) |

(56) References Cited

FOREIGN PATENT DOCUMENTS

| WO | 2019029372 A1 | 2/2019 |
|---|---|---|
| WO | 2020060334 A1 | 3/2020 |
| WO | 2020147927 | 7/2020 |

OTHER PUBLICATIONS

Priority EP Application No. 21159109.4. Extended EP Search Report (Aug. 17, 2021).
Priority EP Application No. 21159109.4. Examination Report (Jun. 29, 2023).
Hetzer Dirk et al: "5G Connected and Automated Driving: Use Cases and Technologies in Cross-border Environments", 2019 European Conference On Networks And Communications (EUCNC), IEEE, Jun. 18, 2019 (Jun. 18, 2019), pp. 78-82, XP033597248, DOI: 10.1109/EUCNC.2019.8801993.
5GAA WG2: "LS to 3GPP on 008 Prediction", 3GPP Draft; SP-180252. A-180156, 3rd Generation Partnership Project (3GPP), Mobile Competence Centre; 650, Route Des Lucioles; F-06921 Sophia-Antipolis Cedex; France vol. TSG SA, No. La Jolla, California, USA; Jun. 13, 2018-Jun. 15, 2018 (Jun. 10, 2018).

* cited by examiner

400

412      414

COMPUTER PROGRAM, APPARATUS, AND METHOD FOR A REMOTE CONTROL CENTER AND FOR OPERATING A VEHICLE FROM REMOTE

RELATED APPLICATIONS

The present application claims priority to International Patent Application No. PCT/EP2022/054390 to Jornod et al., filed Feb. 22, 2022, titled "Computer Program, Apparatus, And Method For A Remote Control Center And For Operating A Vehicle From Remote," which claims priority to German Pat. App. No. 21159109.4 filed Feb. 24, 2021, to Jornod et al., the contents of each being incorporated by reference in their entirety herein.

BACKGROUND

The present disclosure relates to a computer program, an apparatus, and a method for a remote control center and for operating a vehicle from remote. In particular, embodiments relate to a concept for adapting a range of a driving command for operating a vehicle from remote.

Remote driving, also referred to as "tele-operated driving" (ToD), plays an increasingly important role in mobility concepts. In the scope of automated driving, ToD is a concept in which an automated vehicle (AV) is temporary controlled by a remote operator at a remote control center/driving command center (CC), when, for instance, the AV gets into a situation which the AV cannot solve by itself, a so-called "deadlock situation". In order to remotely control the AV, the CC, e.g., "directly" controls the AV's throttle and/or steering. Another concept to remotely control the AV is to provide the AV with high level indirect driving commands (ICs) to be executed by the AV. For this purpose, a communication link between the AV and the CC is provided. Such communication links are subject to fluctuations in their quality of service (QoS). In the event that a drop in QoS occurs right before the AV is supposed to receive a driving command for resolving the deadlock situation, the AV may be unable to receive the 1C and, therefore, to resolve the deadlock situation.

Document "5GAA WG2: "LS to 3GPP on 008 Prediction", 3GPP DRAFT; SP-180252_A-180156, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX; FRANCE vol. TSG SA, no. La Jolla, California, USA; 20180613-20180615 10 Jun. 2018 (2018 Jun. 10), XP051458606" relates to an overall description on the topic "Predictable QoS and End-to-End Network Slicing for Automotive Use Cases (NESQO)".

Document "HETZER DIRK ET AL: "5G Connected and Automated Driving: Use Cases and Technologies in Cross-border Environments", 2019 EUROPEAN CONFERENCE ON NETWORKS AND COMMUNICATIONS (EUCNC), IEEE, 18 Jun. 2019 (2019 Jun. 18), pages 78-82, XP033597248, DOI:10.1109/ EUCNC.2019.8801993" relates to use cases and technologies in cross-border environment in 5G connected driving and automated driving.

Document US 2021/0037495 A1 relates to methods, computer programs, and apparatuses for a command center and a transportation vehicle, a transportation vehicle and command center. The method for a command center to teleoperate a transportation vehicle includes receiving input data from the transportation vehicle, estimating a current uplink delay based on the input data from the transportation vehicle, determining an estimated downlink and uplink delay based on the input data and the estimated current uplink delay, and determining control information for the transportation vehicle which at least partly compensates the estimated downlink and uplink delay. The method also includes transmitting information related to the control information to the transportation vehicle.

Document EP 3723412 A1 relates to a system, a vehicle, apparatuses, methods, and computer programs for user equipment, UE, and service provision in a mobile communication system. The method for user equipment (UE) in a mobile communication system, comprises using a service with a set of quality of service, QoS, requirements in the mobile communication system, receiving information related to a future course of the QoS provisioning of the service from the mobile communication system, and adapting the service based on the information related to the future course of the QoS and based on the set of QoS requirements.

Document WO 2020/147927 A1 describes a session management function (SMF) node configured to receive a request for an in-advance quality of service prediction notification (IQN) and an IQN distribution policy. Also, the SMF node is configured to determine that the quality of service of a Protocol Data Unit (PDU) session handled by the SMF node is predicted to be affected according to the request and the distribution policy. It is further proposed that the SMF nodes sends the IQN to a recipient, e.g., a semi-autonomous vehicle, associated with the PDU session in order to cope with changes of the QoS in remote operation by slowing down the speed of the vehicle or even stop the vehicle. This can lead to an undesirable driving behavior, e.g. undesired stops, of the vehicle.

Document WO 2020/060334 A1 describes a concept for performing QoS prediction in NR V2X and its application for an autonomous vehicle. Even though this concept provides a prediction of the QoS, drops in QoS still may cause that expected ICs are not received in this concept.

Document WO 2019/029372 A1 provides a concept for time advance adjustment for separating user transmission using multiple numerology operations. However, this document does not provide an approach to cope with drops in QoS of a communication link for remote driving.

Hence, there may be a demand for an improved concept for operating a vehicle from remote.

BRIEF SUMMARY

This demand may be satisfied by the subject-matter of the appended independent and dependent claims.

Embodiments of the present disclosure are based on the finding that it may be beneficial to provide a vehicle with a driving command right before a QoS of a communication link for remotely operating the vehicle becomes insufficient and that an effective length of driving commands may be adjusted to cope with insufficient QoS and, e.g., guide the vehicle through a situation with insufficient QoS. To this end, it is proposed to provide the vehicle, based on a predicted QoS (pQoS), with a driving command right before the QoS becomes insufficient and/or to adjust the effective length of the driving command based on the pQoS.

In some examples, a method is disclosed for a remote control center and for operating a vehicle from remote. The method comprises obtaining information on a pQoS of a communication link between the remote control center and the vehicle. Further, the method comprises providing at least one driving command to the vehicle via the communication link and adapting a range of the at least one driving command based on the information on the pQoS. The driving command, e.g., the last driving command before the QoS of the communication link becomes insufficient for remote driving and/or providing driving commands via the communication link. For adapting the range, it is, e.g., adjusted when and/or where the vehicle receives the driving command and for how long the driving command is to be effective. So, adapting the range e.g., allows to enlarge a distance over which the vehicle is guided based on the driving command while the QoS is insufficient and, thus, e.g., to avoid that the vehicle ends up in a deadlock situation there.

In some examples, the information on the pQoS comprises information on a change of the pQoS and adapting the range of the driving command comprises adapting the range of the driving command based on the information on the change of the pQoS.

In some examples the information on the pQoS indicates an interval for which the pQoS of the communication link falls short of a predefined level and adapting the range of the driving command comprises adapting the range of the driving command based on the interval to maneuver the vehicle throughout the interval based on the driving command. This allows to guide the vehicle based on the driving command (completely) through periods where the QoS of the communication link is insufficient.

The interval, may be a time interval or an area which allow to define a time or a space for the range, respectively. One skilled in the art having benefit from the present disclosure will appreciate that if the interval is an area, a synchronization of the vehicle and the remote control center may be omitted. Otherwise, if the interval is a time interval, location of the vehicle may be omitted.

One skilled in the art will also appreciate that the vehicle's velocity indicates a time-space relation which allows to convert between space and time to implement the proposed method in a location-based or time-based manner.

In some examples, the method further comprises obtaining, based on the information on the pQoS, information on a traffic situation in the interval and adapting the driving command based on the information on the traffic situation. In this way, the command may be specifically adapted to the traffic situation prevailing in the interval for a higher accuracy and/or reliability of the driving command in the interval.

In some examples, the driving command may be indicative of a trajectory of the vehicle and adapting the range of the driving command comprises adapting the trajectory based on the information on the pQoS. By means of the trajectory, the vehicle can be controlled more precisely than, for example, on the basis of waypoints.

Also, the driving command may be indicative of a number of waypoints for the vehicle and adapting the range of the driving command may comprise adapting the number of waypoints and/or a distance between the waypoints which may require less computation power than controlling the vehicle using the trajectory. Also, the waypoints may provide a greater scope of action for the vehicle while acting based on the driving command.

Optionally, the driving command may be indicative of modifications of an environmental model according to which the vehicle maneuvers at least partially automatically and adapting the range of the driving command comprises adapting a horizon of the environmental model. The environmental model provides a greater scope of action than the trajectory or waypoints while acting based on the driving command.

In some examples, the method comprises adapting a timing for providing the driving command based on the information on the pQoS. The timing, e.g., is indicative of a time it takes to determine the driving command and provide the driving command to the vehicle. So, adapting the timing, e.g., comprises adapting the processing for determining the driving command to provide the driving command in time, i.e., to provide the driving command to the vehicle right in time before the QoS becomes insufficient.

In particular, the timing may depend on a time for emitting the driving command to the vehicle and adapting the timing of the driving command may comprise adapting the time for emitting the driving command based on the information on the pQoS. In this way it may be ensured that the driving command reaches the vehicle before the QoS becomes insufficient.

Optionally, the method further comprises providing at least one preceding driving command to the vehicle via the communication link and adapting a range of the at least one preceding driving command based on the information on the pQoS. This allows to coordinate the previous driving command with the above said last driving command before the QoS becomes insufficient, as discussed in greater detail below.

Also, the method further may include providing at least one subsequent driving command to the vehicle via the communication link and adapting a range of the at least one subsequent driving command based on the information on the pQoS. In applications where the vehicle is provided with driving commands regularly in accordance with a predefined raster, this, e.g., enables to "get back" into the raster after adaptions of the range of preceding driving commands.

Further embodiments include a computer program having a program code for performing at least one of the methods of the preceding claims, when the computer program is executed on a computer, a processor, or a programmable hardware component.

Other embodiments include an apparatus comprising one or more interfaces for communication and a data processing circuit configured to control the one or more interfaces. The data processing circuit and the one or more interfaces are configured to execute one of the methods proposed herein.

BRIEF DESCRIPTION OF THE DRAWINGS

Some other features or aspects will be described using the following non-limiting embodiments of apparatuses or methods or computer programs or computer program products by way of example only, and with reference to the accompanying figures, in which.

BRIEF DESCRIPTION OF THE DRAWINGS

Figure 1:
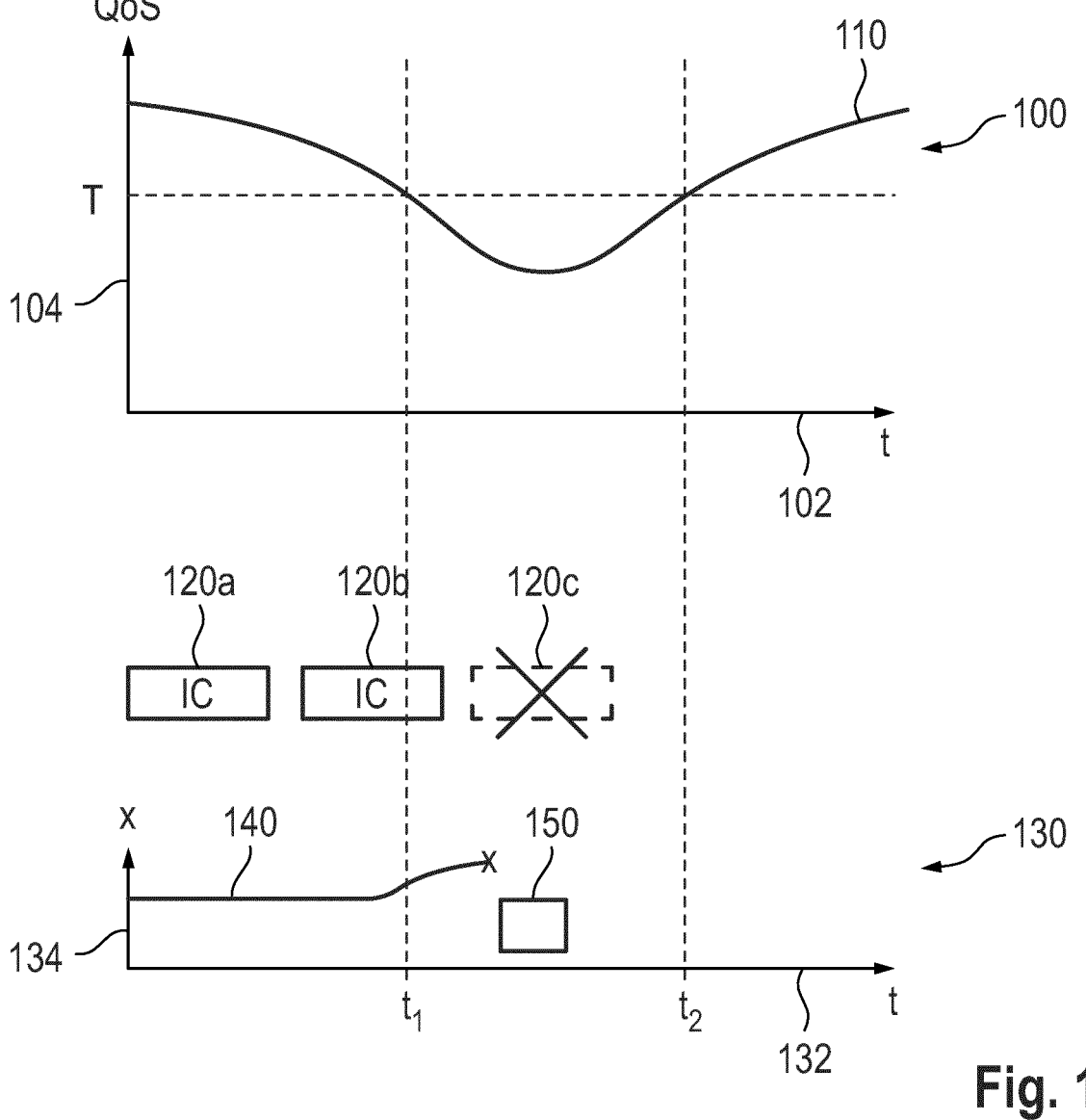
FIG. 1 schematically illustrates an exemplary scenario in known concepts for remote driving.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the present disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes", or "including", when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In known concepts for remote driving, a remotely operated vehicle is provided with high-level indirect driving commands to guide the vehicle. Such commands, e.g., are trajectories to be followed by the vehicle automatically, i.e., the vehicle itself controls throttle and/or steering to follow the trajectories. In the existing concepts, the driving commands have the same effective length. Thus, the said trajectories have the same length, e.g., a predefined number of meters or kilometers. With fluctuations in a QoS of a communication link for communicating the driving commands, this may lead to scenarios schematically illustrated in FIG. 1. Such fluctuations, e.g., occur due to shadowing or communication resource allocations.

FIG. 1 shows a diagram 100 where a QoS 110 of a (wireless) communication link for communication of driving commands 120a, 120b, and 120c between a remote control center and a vehicle is plotted over an ordinate 104 indicating the QoS and an abscissa 102 indicating time. The QoS 110, e.g., is indicative of a data rate, a latency, and/or other criteria affecting the communication of the driving commands 120a, 120b, and 120c via the communication link. As indicated by FIG. 1, the driving commands 120a, 120b, and 120c are provided regularly.

As can be seen from diagram 100, due to QoS fluctuations, the QoS 110 may fall short of a level T between time h and time t2, thereby becoming insufficient to provide the vehicle with driving commands. So, the vehicle may receive the driving commands 120a and 120b transmitted before time h but may be unable to receive driving command 120c between $t_1$ and $t_2$.

FIG. 1 also depicts a diagram 130 which schematically illustrates a path 140 of trajectories provided by the driving commands 120a and 120b to guide the vehicle along path 140. In diagram 130, path 140 is plotted over an abscissa 132 matching with abscissa 102 and over an ordinate 134 indicating a position x of the vehicle in one dimension. It is noted that although position x is plotted in one dimension, position x optionally may be indicative of multiple dimensions. As schematically illustrated by diagram 130, the vehicle may encounter an obstacle 150 between h and which may bring the vehicle into a deadlock situation where the vehicle is unable to go around obstacle 150 automatically. In the known concept, the trajectories of the driving commands 120a, 120b, and 120c have equal and fixed length. Due to this, it may happen that the trajectory of driving command 120b and, thus, path 140 ends between $t_1$ and $t_2$ and where the vehicle is supposed to receive driving command 120c to resolve the deadlock situation resulting from obstacle 150. Since the vehicle is unable to receive driving command 120c, the deadlock situation may remain unresolved. As a result, the vehicle may stop and/or a manual driver in the vehicle may need to "manually" resolve the deadlock situation.

Hence, there is a need for an improved concept for operating a vehicle from remote. In the following, with reference to further drawings, various examples are provided that may provide solutions to this need.

Figure 2:
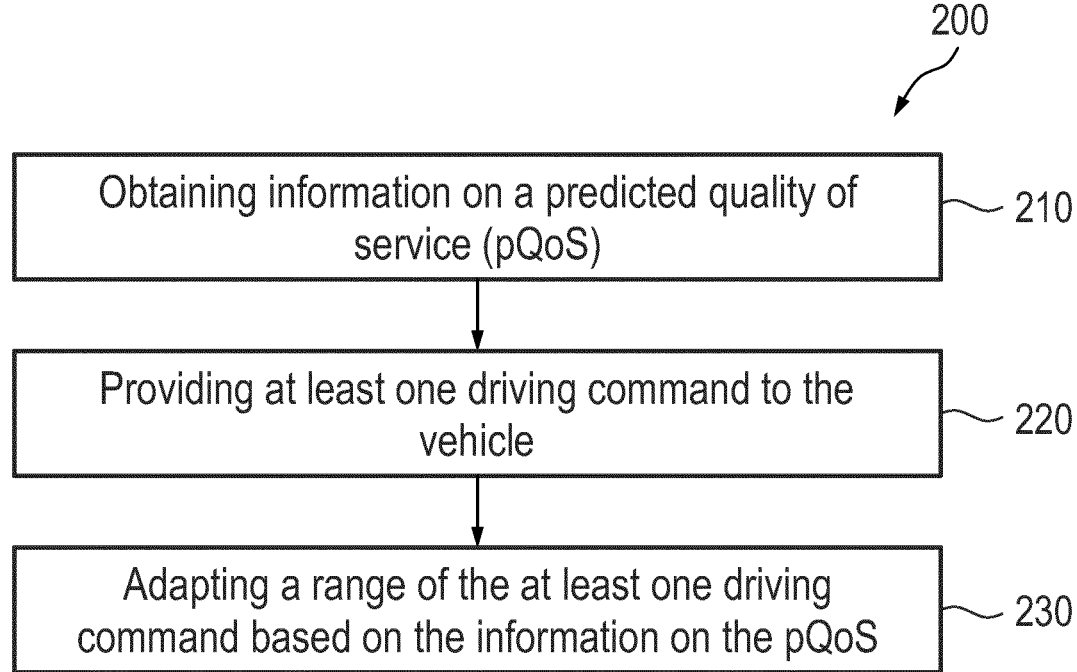
FIG. 2 illustrates a flowchart of a method for a remote control center, according to some aspects of the present disclosure.

FIG. 2 illustrates a flow chart of an embodiment of a method 200 for a remote control center and for operating a vehicle from remote. The vehicle, e.g., is configured to be operated automatically or at least partly automatically and operated from remote by the remote control center, e.g., to resolve deadlock situations which the vehicle cannot handle automatically. In particular, the vehicle may be a car, a truck, a bus, an aerial vehicle, a watercraft, or the like.

In order to operate the vehicle from remote, a (wireless) communication link may be established between the vehicle and the remote control center via a mobile or wireless communications network. The mobile or wireless communication system may correspond to a mobile communication network of the 5th Generation (5G, or New Radio) and may use mm-Wave technology. The mobile communication network may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

As can be seen from the flow chart, method 200 comprises obtaining 210 information on a predicted quality of service (pQoS) of the communication link between the remote control center and the vehicle. The pQoS, e.g., is indicative of a future QoS of the communication link. The QoS, e.g., is indicative of a data rate, a latency, and/or other criteria for quality of communication between the vehicle and the remote control center. So, the information on the pQoS, e.g., indicates changes of the QoS and/or when and/or where the QoS is sufficient and/or insufficient for operating the vehicle from remote by the remote control center and/or communicating driving commands. For obtaining 210 the information on the pQoS, the remote control center receives the information on the pQoS and/or determines the information on the pQoS itself. The skilled person having benefit from the present disclosure will understand that the pQoS may be determined based on information on a location of the vehicle, road infrastructure, communications network for communication between the vehicle and the remote control center, weather conditions, network coverage, large events (e.g. sport events, concerts, etc.), and/or based on network data analytics.

Further, method 200 comprises providing 220 at least one driving command to the vehicle via the communication link. The driving command can be understood as an instruction for the vehicle to guide it and, e.g., indicates a trajectory, waypoints, a "high-level" task/instruction (e.g., like: "follow the road for Y meters/seconds" or "avoid the obstacle at coordinates C"), an environmental model according to which the vehicle maneuvers automatically or at least semi-automatically, and/or the like. The driving command may be a driving command provided to the vehicle before the QoS becomes insufficient and, in particular, the last driving command which the vehicle receives before the QoS becomes insufficient. Also, method 200 may comprise adapting the range of a preceding or subsequent driving command, as stated in more detail later.

Further, method 200 comprises adapting 230 a range of the at least one driving command based on the information on the pQoS. The range may indicate when, and/or for how long the driving command is effective for the vehicle, i.e., when, where, and/or for how long the vehicle acts according to the driving command. In other words, the range indicates when, where, and/or for how long the driving command is valid or when, where, and/or for how long the driving command is effective. The range, e.g., is defined temporally, e.g., by a starting time, an end time, and/or an effective temporal length where the vehicle is supposed to follow the driving command. Optionally, the range is spatially defined, i.e. the range is defined by a starting position, an end position, and/or an effective travel length where the vehicle is supposed to follow the driving command. So, adapting 230 the range, e.g., comprises adjusting the starting time, the end time, the effective temporal length, the starting position, the end position, and/or the effective travel length. In order to adapt the length, e.g., the trajectory, a number and/or distance of the waypoints, and/or a horizon of the environmental model is adapted in accordance with the starting position, the effective travel length, and/or the end position. The horizon, e.g., is a scope of the environmental model.

In some examples, the range may be adapted so as to enlarge a distance over which the vehicle is guided since the QoS became insufficient. To this end, the starting time and/or starting position of the driving command is selected based on the information on the pQoS such that the driving command "starts" right before the QoS becomes insufficient according to the information on the pQoS. The starting time and/or starting position, e.g., is a few seconds or meters, respectively, before the QoS changes such that it falls short of a predefined level of QoS required for communicating driving commands and/or environmental data (e.g., sensor data, camera data, etc.) for remote driving.

Also, adapting 230 the range of the driving command may comprise enlarging an effective length, i.e., the effective travel length or effective temporal length, where the vehicle follows the driving command to enlarge a travel distance over which the vehicle is guided by the driving command since the QoS became insufficient. This may avoid or delay that the vehicle has to switch to its automated driving mode and end up in a deadlock situation.

Optionally, the information on the pQoS indicates time interval or an area for which the pQoS of the communication link falls short of a predefined level. The predefined level, e.g., indicates a minimum QoS level required to communicate the driving command and/or environmental information on the environment of the vehicle between the vehicle and the remote control center. The time interval or the area, e.g., indicate a time interval or area, respectively, in which the QoS falls short of the minimum QoS level due to allocation of communication resources and/or shadowing. In this event, the range may be adapted such that it guides the vehicle throughout the time interval or area, respectively, based on the driving command. In other words, the range may be adapted such that it guides the vehicle completely through the time interval or area where the QoS is insufficient.

Optionally, method 200 further comprises obtaining, based on the information on the pQoS, information on a traffic situation in the interval. So, specifically the traffic situation prevailing in the interval may be evaluated based on the information on the pQoS. For this purpose, e.g., an evaluation scope is adapted in which sensor data of the environment is evaluated. Thus, adapting the driving command based on the information on the traffic situation may lead to a more accurate and/or more reliable driving command for the interval, i.e., for guiding the vehicle in this interval.

Method 200 may also further comprise adapting a timing for providing 220 the driving command based on the information on the pQoS. To this end, e.g., a timing for processing the environmental information is adjusted to obtain the driving command in time, i.e., such that the driving command is communicated to the vehicle before the QoS becomes insufficient.

Accordingly, the timing may depend on a time for emitting the driving command to the vehicle. In order to provide the vehicle with the driving command, the driving command may be emitted in time and such that the driving command reaches the vehicle before the QoS becomes insufficient. The information on the pQoS may particularly indicate a latency of the communication link and, thus, denotes how long it takes the driving command to reach the vehicle. So, the time for emitting the driving command may be adapted based on the latency such that the driving command reaches the vehicle before the QoS becomes insufficient and, e.g., the communication link breaks off.

In some examples, method 200 may be executed by the remote control center.

Further exemplary embodiments of method 200 are described with reference to FIG. 3 which illustrates an exemplary scenario for the proposed concept for remote driving.

Figure 3:
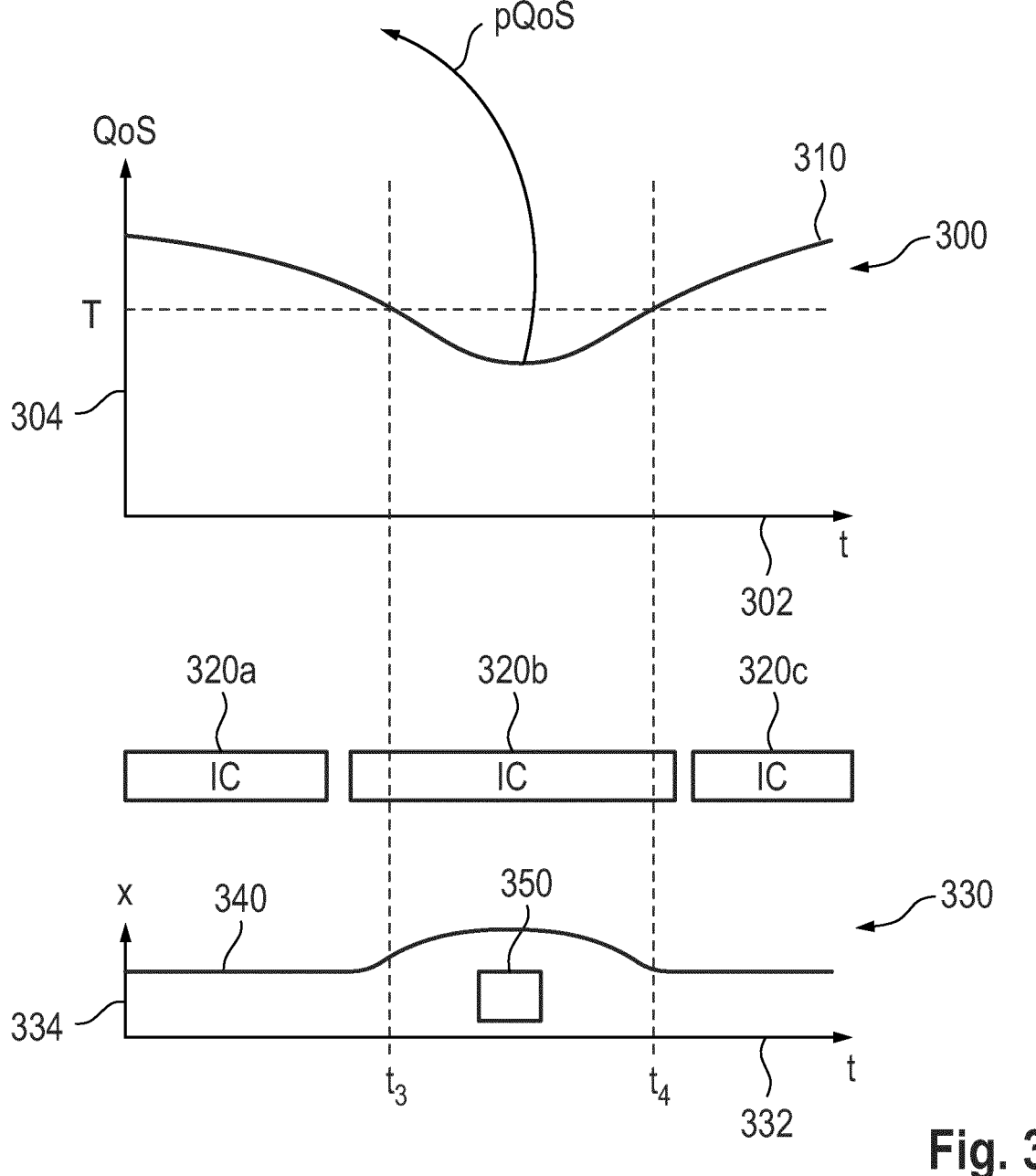
FIG. 3 illustrates an operating environment for remote driving, according to some aspects of the present disclosure.

FIG. 3 shows a diagram 300 showing a time course of QoS 310 of a (wireless) communication link for communication of driving commands 320a, 320b, and 320c between a remote control center and a vehicle plotted over an ordinate 304 indicating the QoS and an abscissa 302 indicating time. The QoS 310, e.g., is indicative of a data rate, a latency, and/or other criteria affecting the communication of the driving commands 320a, 320b, and 320c via the communication link.

In order to determine the driving commands, the remote control center for operating the vehicle from remote, e.g., evaluates environmental information (e.g. sensor data, camera data, map) on the environment of the vehicle and adapts the driving commands appropriately to maneuver the vehicle through the environment based on the driving commands.

As can be seen from diagram 300, due to QoS fluctuations, the QoS 310 may fall short of a level T between time t3 and time t4, thereby becoming insufficient to provide the vehicle with driving commands. So, the vehicle may be unable to receive driving commands between $t_3$ and $t_4$.

Also, FIG. 3 also depicts a diagram 330 showing a path 340 including trajectories and/or waypoints provided by the driving commands 320a, 320b, and 320c. Abscissa 334 of diagram 330 indicates a position x of the vehicle and ordinate 332 of diagram 300 indicates time t. As can be seen from diagram 330, the vehicle encounters an obstacle 350 between $t_3$ and $t_4$ which may cause the vehicle to end up in a deadlock situation if the vehicle was in an automated driving mode. Thus, it is provided to operate the vehicle based on driving commands from the remote control center. By default, the vehicle may receive driving commands in accordance with a predefined raster, e.g., in order to operate multiple vehicles in a coordinated way. The raster, e.g., provides to supply the vehicle and other vehicles successively and regularly with driving commands having the same effective length. However, embodiments of method 200 propose to deviate from the raster to avoid ending up in a deadlock situation between $t_3$ and $t_4$ as follows:

As indicated by diagram 300, it is proposed that the remote control center obtains information on pQoS, which, e.g., indicates the time course of the QoS 310, times $t_3$ and $t_4$, and/or an interval between $t_3$ and $t_4$. In order to avoid that the vehicle operates automatically and ends up in a deadlock situation between $t_3$ and $t_4$, it is provided that driving command 320b ranges at least over the interval between $t_3$ and $t_4$. For this, the remote control center evaluates environmental information on the environment of the vehicle, based on the information on the pQoS, before $t_3$, taking into account processing time for obtaining driving command 320b such that driving command 320b is emitted to the vehicle by at least the latency before $t_3$. Also, driving command 320b may be specifically adapted to a traffic situation prevailing between $t_3$ and $t_4$. For this, the evaluation scope in which the environmental data is evaluated may be adapted to the pQoS and/or the interval between $t_3$ and $t_4$. In this way, driving command 320b is specifically adapted to maneuver the vehicle around obstacle 350. In order to guide the vehicle completely through the interval between $t_3$ and $t_4$, a starting time/position of driving command 320b is set such that the vehicle starts following command 320b before or at $t_3$ and its end time/position is set such that the vehicle stops following command 320b at or after $t_4$. To this end, optionally, the effective length over which the vehicle follows command 320b is set accordingly. In this way, the vehicle may be safely guided through the interval between $t_3$ and $t_4$. This may also result in a deviation from the predefined raster. Accordingly, the range of the preceding driving command 320a and the subsequent driving command 320c may be adapted based on the information on the pQoS. As can be seen from FIG. 3, the range of the preceding driving command 320a is adapted based on the information on the pQoS such that the vehicle stops following the preceding driving command 320a before or at the starting time/position of driving command 320b to avoid overlapping of the driving commands 320a and 320b. Analogously, the range of the subsequent driving command 320c is adapted such that the vehicle starts following the subsequent driving command 320c not before the end time/position of driving command 320b. Moreover, the range of the subsequent driving command 320c may be adapted so as to "get back into" the predefined raster.

In other scenarios, the interval between $t_3$ and $t_4$ may be too large to guide the vehicle safely through the whole interval using a single driving command. In such scenarios, the range of driving command 320b may be adapted to an extent can be adapted to a maximum range up to which safety is assured. The skilled person will understand that, in this way, the vehicle may get into a deadlock situation between $t_3$ and $t_4$ less likely or a deadlock situation may at least be delayed.

The proposed concept may be also implemented in an apparatus for a remote control center.

Figure 4:
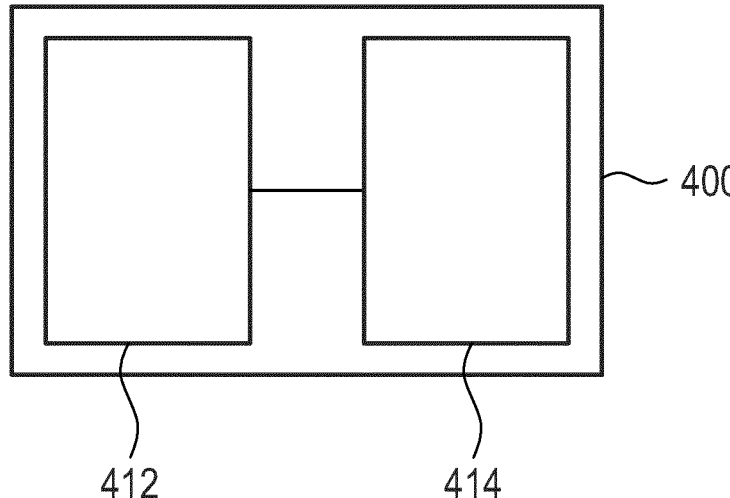
FIG. 4 illustrates a block diagram schematically illustrating an apparatus for implementing the methods disclosed herein, according to some aspects of the present disclosure.

FIG. 4 illustrates a block diagram schematically illustrating an embodiment of an apparatus 400 for implementing the proposed concept.

Apparatus 400 comprises one or more interfaces 412 for communication and a data processing circuit 414 configured to control the one or more interfaces 412. The data processing circuit 414 and the one or more interfaces 412 are configured to execute the proposed concept.

In embodiments the one or more interfaces 412 may comprise means for communication with the vehicle to operate the vehicle from remote. For this, the one or more interfaces 412 may comprise or correspond to any means for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 412 may comprise further components to enable according communication between the mobile communications device 406, the vehicle 404, and the server 402, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 412 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc.

As shown in FIG. 4 the one or more interfaces 412 are coupled to the data processing circuit 414. In embodiments the data processing circuit 414 may comprise any means for processing information according to method 200. The data processing circuit 414 may be implemented using one or more processing units, one or more processing devices, any means for processing, such as a processor, a computer or a programmable hardware component being operable with accordingly adapted software. In other words, the described functions of the data processing circuit 414 may as well be implemented in software, which is then executed on one or more programmable hardware components. Such hardware components may comprise a general-purpose processor, a Digital Signal Processor (DSP), a micro-controller, etc.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the present disclosure. It will thus be appreciated that those skilled in the art will be able to devise various arrangements that, although not explicitly described or shown herein, embody the principles of the present disclosure and are included within its scope. Furthermore, all examples recited herein are principally intended expressly to be only for pedagogical purposes to aid the reader in understanding the principles of the present disclosure and the concepts contributed by the inventor(s) to furthering the art and are to be construed as being without limitation to such specifically recited examples and conditions. Moreover, all statements herein reciting principles, aspects, and embodiments of the present disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure.

Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

REFERENCE LIST

100 diagram
102 abscissa
104 ordinate
110 QoS
120*a* driving command
120*b* driving command
120*c* driving command
130 diagram
132 abscissa
134 ordinate
140 path
150 obstacle
200 method for a remote control center and for operating a vehicle from remote
210 obtaining information on a predicted quality of service
220 providing at least one driving command to the vehicle
230 adapting a range of the at least one driving command
300 diagram
302 abscissa
304 ordinate
310 QoS
320*a* driving command
320*b* driving command
320*c* driving command
330 diagram
332 abscissa
334 ordinate
340 path
350 obstacle

The invention claimed is:

1. A method for a remote control center for remotely operating a vehicle, comprising:

obtaining information on a predicted quality of service (pQoS) of a communication link between the remote control center and the vehicle;

providing at least one driving command to the vehicle via the communication link; and adapting a range of the at least one driving command based on the information on the pQoS by adjusting at least one of a spatial or temporal extent over which the at least one driving command remains effective to guide the vehicle through an interval during which the pQoS is predicted to fall below a threshold level, wherein the at least one driving command is configured to remain effective throughout the interval when the communication link is insufficient to provide additional driving commands to the vehicle.

2. The method of claim 1, wherein the information on the pQoS comprises information on a change of the pQoS, and wherein adapting the range of the at least one driving command comprises adapting the range of the at least one driving command based on the information on the change of the pQoS.

3. The method of claim 1, wherein the information on the pQoS comprises a time interval in which the pQoS of the communication link falls below a configured level, and wherein adapting the range of the at least one driving command comprises adapting the range of the at least one driving command based on the time interval to maneuver the vehicle throughout the interval based on the at least one driving command.

4. The method of claim 3, wherein the interval further comprises an area in which the pQoS of the communication link falls short of the configured level.

5. The method of claim 1, further comprising
obtaining, based on the information on the pQoS, information on a traffic situation in the interval; and
adapting the at least one driving command based on the information on the traffic situation.

6. The method of claim 1, wherein the at least one driving command comprises data indicating a trajectory of the vehicle, and wherein adapting the range of the driving command comprises adapting the trajectory based on the information on the pQoS.

7. The method of claim 1, wherein the at least one driving command comprises data indicating a number of waypoints for the vehicle, and wherein adapting the range of the driving command comprises adapting the number of waypoints and/or a distance between the waypoints.

8. The method of claim 1, wherein the at least one driving command comprises data indicating modifications of an environmental model according to which the vehicle maneuvers at least partially automatically, and wherein adapting the range of the driving command comprises adapting a horizon of the environmental model.

9. The method of claim 1, further comprising adapting a timing for providing the at least one driving command, based on the information of the pQoS.

10. The method of claim 9, wherein the timing depends on a time for emitting the at least one driving command to the vehicle, and wherein adapting the timing of the driving command comprises adapting the time for emitting the at least one driving command based on the information on the pQoS.

11. The method of claim 1, further comprising:
providing at least one preceding driving command to the vehicle via the communication link; and
adapting a range of the at least one preceding driving command based on the information on the pQoS.

12. The method of claim 1, further comprising adapting the range of the at least one driving command based on a relation between the vehicle's velocity and a predicted duration or area of insufficient quality of service, wherein the relation enables conversion between a time-based and a location-based range adaptation.

13. The method of claim 1, further comprising:
providing at least one subsequent driving command to the vehicle via the communication link; and
adapting a range of the at least one subsequent driving command based on the information on the pQoS.

14. An apparatus for a remote control center for remotely operating a vehicle, comprising:
one or more interfaces for communication;
a data processing circuit, configured to control the one or more interfaces, wherein the data processing circuit and the one or more interfaces are configured to
obtain information on a predicted quality of service (pQoS) of a communication link between the remote control center and the vehicle;
provide at least one driving command to the vehicle via the communication link; and
adapt a range of the at least one driving command based on the information on the pQoS by adjusting at least one of a spatial or temporal extent over which the at least one driving command remains effective to guide the vehicle through an interval during which the pQoS is predicted to fall below a threshold level, wherein the at least one driving command is configured to remain effective throughout the interval when the communication link is insufficient to provide additional driving commands to the vehicle.

15. The apparatus of claim 14, wherein the information on the pQoS comprises one of:
(i) information on a change of the pQoS, and wherein the data processing circuit and the one or more interfaces are configured to adapt the range of the at least one driving command by adapting the range of the at least one driving command based on the information on the change of the pQoS, or
(ii) a time interval in which the pQoS of the communication link falls below a configured level, and wherein the data processing circuit and the one or more interfaces are configured to adapt the range of the at least one driving command by adapting the range of the at least one driving command based on the time interval to maneuver the vehicle throughout the interval based on the at least one driving command.

16. The apparatus of claim 15, wherein the interval further comprises an area in which the pQoS of the communication link falls short of the configured level.

17. The apparatus of claim 14, wherein the data processing circuit and the one or more interfaces are further configured to
obtain, based on the information on the pQoS, information on a traffic situation in the interval; and
adapt the at least one driving command based on the information on the traffic situation.

18. The apparatus of claim 14, wherein the at least one driving command comprises one of:
(i) data indicating a trajectory of the vehicle, and wherein the data processing circuit and the one or more interfaces are further configured to adapt the range of the driving command by adapting the trajectory based on the information on the pQoS,
(ii) data indicating a number of waypoints for the vehicle, and wherein the data processing circuit and the one or more interfaces are further configured to adapt the range of the driving command by adapting the number of waypoints and/or a distance between the waypoints, or
(iii) data indicating modifications of an environmental model according to which the vehicle maneuvers at least partially automatically, and wherein the data processing circuit and the one or more interfaces are further configured to adapt the range of the driving command by adapting a horizon of the environmental model.

19. The apparatus of claim 14, wherein the data processing circuit and the one or more interfaces are further configured to adapt a timing for providing the at least one driving command, based on the information of the pQoS, wherein the timing depends on a time for emitting the at least one driving command to the vehicle, and wherein adapting the timing of the driving command comprises adapting the time for emitting the at least one driving command based on the information on the pQoS.

20. A non-transitory computer-readable medium having stored therein instructions executable by one or more processors for remotely operating a vehicle, the instructions being configured to:

obtain information on a predicted quality of service (pQoS) of a communication link between the remote control center and the vehicle;

provide at least one driving command to the vehicle via the communication link; and adapt a range of the at least one driving command based on the information on the pQoS by adjusting at least one of a spatial or temporal extent over which the at least one driving command remains effective to guide the vehicle through an interval during which the pQoS is predicted to fall below a threshold level, wherein the at least one driving command is configured to remain effective throughout the interval when the communication link is insufficient to provide additional driving commands to the vehicle.

* * * * *